(12) United States Patent
Hartness et al.

(10) Patent No.: US 7,721,876 B2
(45) Date of Patent: May 25, 2010

(54) ADJUSTABLE SIDE RAILS FOR ARTICLE CONVEYING SYSTEM, AND CONVEYOR AND SYSTEM INCORPORATING SAME

(75) Inventors: Thomas P. Hartness, Greenville, SC (US); Mark W. Davidson, Greer, SC (US)

(73) Assignee: Illinois Tool Works Inc., Glenview, IL (US)

( * ) Notice: Subject to any disclaimer, the term of this patent is extended or adjusted under 35 U.S.C. 154(b) by 658 days.

(21) Appl. No.: 11/588,843

(22) Filed: Oct. 27, 2006

(65) Prior Publication Data

US 2008/0099311 A1 May 1, 2008

(51) Int. Cl.
*B65G 21/20* (2006.01)
(52) U.S. Cl. .................... 198/836.3; 198/836.4
(58) Field of Classification Search ............ 198/836.1, 198/836.2, 836.3, 836.4
See application file for complete search history.

(56) References Cited

U.S. PATENT DOCUMENTS

| | | | |
|---|---|---|---|
| 4,460,692 A * | 7/1984 | Tellier et al. ................ | 435/248 |
| 5,211,280 A | 5/1993 | Houde | |
| 5,515,668 A * | 5/1996 | Hunt et al. .................... | 53/543 |
| 6,050,396 A * | 4/2000 | Moore ..................... | 198/836.3 |
| 6,209,707 B1 * | 4/2001 | Ronchi ....................... | 198/445 |
| 6,244,429 B1 * | 6/2001 | Drewitz et al. ........... | 198/836.3 |
| 6,360,880 B1 * | 3/2002 | Ouellette ................. | 198/836.1 |
| 6,378,695 B1 | 4/2002 | Rinne | |
| 6,460,689 B2 * | 10/2002 | Albrecht et al. .......... | 198/735.3 |
| 6,523,823 B1 * | 2/2003 | Bakoledis .................... | 271/223 |
| 6,578,702 B2 * | 6/2003 | Falkowski .................. | 198/575 |
| 7,036,658 B2 | 5/2006 | Hartness et al. | |
| 7,520,380 B2 * | 4/2009 | Ranger .................... | 198/861.1 |
| 2003/0085104 A1 | 5/2003 | Falkowski | |
| 2003/0094352 A1 | 5/2003 | Andreoli et al. | |

FOREIGN PATENT DOCUMENTS

WO WO 2005 118437 12/2005

OTHER PUBLICATIONS

International Search Report (PCT/US2007/082800) 5 pages.

* cited by examiner

*Primary Examiner*—Douglas A Hess
(74) *Attorney, Agent, or Firm*—Dority & Manning, P.A.

(57) ABSTRACT

An assembly is disclosed for positioning side rails for an article handling conveyor extending in a conveying direction. The assembly includes a frame, two side rails movably mounted to the frame on opposite sides of the conveyor and extending along the conveying direction, each side rail including an input gear. A gear train extends between an actuator and the at least one input gear, whereby movement of the actuator in one direction or the other moves the side rails simultaneously toward or away from the each other via the gear train and the input gear. Multiple rail assemblies along a conveyor, across different sides of a conveyor, and/or along or across different conveyors can be employed. The multiple assemblies can be controlled by a common controller.

10 Claims, 6 Drawing Sheets

ADJUSTABLE SIDE RAILS FOR ARTICLE CONVEYING SYSTEM, AND CONVEYOR AND SYSTEM INCORPORATING SAME

FIELD OF THE INVENTION

The present invention relates generally to adjustable side rails for an article conveying system. More particularly, the present invention relates to side rails, conveyors, and systems including such rails in which the rail positioning may be readily positioned and repositioned.

BACKGROUND OF THE INVENTION

Various article conveying systems have been proposed for moving articles such as containers. Some of such systems include conveyors having movable grippers for holding the articles on the conveyors as the conveyors move along a conveying path. U.S. Pat. No. 7,036,658 discloses various examples of such conveyors. Often, such movable grippers can move to a position to conform to the size or orientation of the conveyed articles. Such conveyer grippers are thus "self-adjustable" to take into account the article being conveyed.

Other conveyor systems include side rails to confine or direct the conveyed articles. The side rails are mounted adjacent the movable conveyors. The rails may be adjustable to take into account different article sizes. Typically, numerous individual fasteners have to be tightened, the rail moved, and the fastener retightened, to change the width of a conveying path, for example during a change from one type of conveyed articles to another. It can be very time consuming and labor intensive to make such a change. It can also be difficult to accurately position the numerous side rails along a conveying path, in particular rails along any curved portions of the path. Also, such rails can become loosened over time, requiring frequent inspection and adjustment for optimal performance.

Accordingly, improved side rail for conveying systems for articles such as containers would be welcome, addressing one or more of the above drawbacks of conventional technology, and/or other disadvantages of currently available technology.

SUMMARY OF THE INVENTION

According to certain aspects of the invention, an adjustable rail assembly is disclosed for an article handling conveyor extending in a conveying direction, the assembly including a frame, a first toothed rack movably mounted to the frame and driven by the drive gear, the first toothed rack extending along the conveying direction, a plurality of driven gears rotatably mounted to the frame and driven by the first toothed rack, a plurality of second toothed racks movably mounted to the frame, each second toothed rack driven by one of the driven gears, the second toothed racks extending across the conveying direction, and a side rail extending along the conveying direction for the article handling conveyor attached to the second toothed racks, whereby movement of the first toothed rack in one direction or the other moves the side rail toward or away from the center of the conveyor via the first toothed rack, the driven gears and the second toothed racks. Various options and modifications are possible.

For example, the side rail may comprise a first side rail, the assembly further including a second side rail, the first side rail and second side rail mounted on opposite sides of the center of the conveyor and moving in unison in opposite directions relative to the center of the conveyor. Also, the assembly may include a plurality of the first toothed racks arranged along the conveyor driven by a plurality of the drive gears for moving a plurality of side rails. The first toothed racks may be arranged along a single conveyor and/or multiple conveyors within an article handling system. A controller may be provided in electronic communication with a plurality of actuators, each actuator driving one of the toothed racks. The first toothed racks may be connected together at their ends so as to be drivable via a single actuator.

The driven gear may have a first set of teeth meshing with the first toothed rack and a second set of teeth meshing with the second toothed rack. The first toothed rack may be substantially linear or substantially curved.

According to other aspects of the invention, an assembly is disclosed for positioning side rails for an article handling conveyor extending in a conveying direction, the assembly including a frame, two side rails movably mounted to the frame on opposite sides of the conveyor and extending along the conveying direction, each side rail including an input gear, and a gear train extending between an actuator and the at least one input gear, whereby movement of the actuator in one direction or the other moves the side rails simultaneously toward or away from the each other via the gear train and the input gear. Again, various options and modifications are possible.

According to other aspects of the invention, a conveying system is disclosed for conveying articles along a conveying direction, the system including a first conveyor, an article processing station downstream from the first conveyor, a second conveyor downstream of the article processing station, the first and second conveyors each having adjustable side rail assemblies for guiding the articles along the conveyors. Each adjustable side rail assembly includes a frame, a side rail movably mounted to the frame along the respective first or second conveyor and extending along the conveying direction, the side rail including an input gear, and a gear train extending between the drive gear and the at least one input gear, whereby movement of the actuator in one direction or the other moves the side rail toward or away from the center of the conveyor. A controller is in communication with the actuators, whereby when the controller sends signals to actuators, the drive gears rotate and position the side rails relative to the centers of the respective first and second conveyors via the gear trains. Again, various options and modifications are possible For example, each adjustable side rail assembly may include two of the side rails. The two side rails may be mounted on opposite sides of the center of the respective first or second conveyor and moving in unison in opposite directions relative to the center of the conveyor. Also, the two side rails may be mounted along one side of the center of the respective first or second conveyor.

DETAILED DESCRIPTION OF THE PREFERRED EMBODIMENTS

Figure 1:
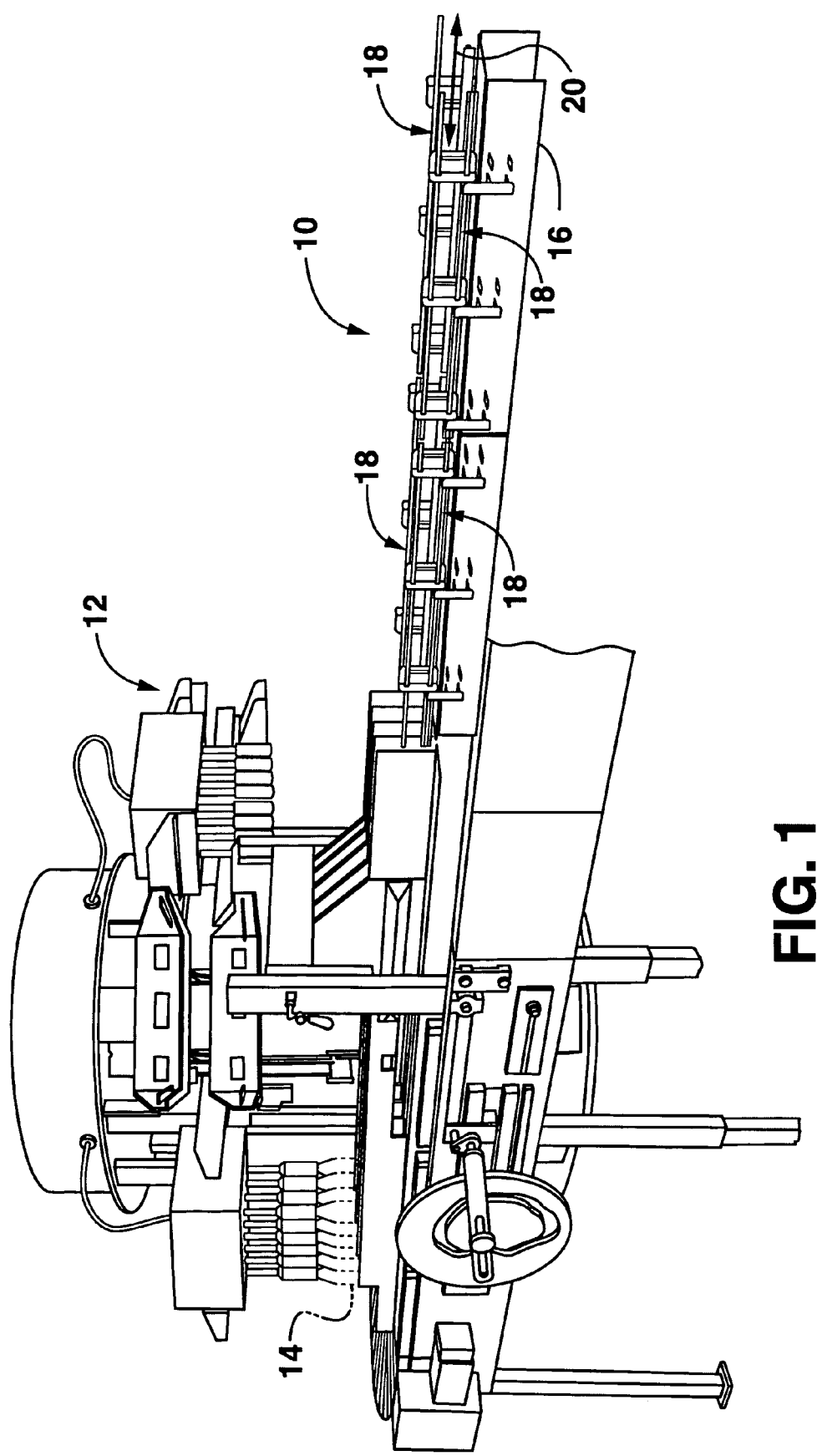
FIG. 1 is a perspective view of a portion of an article handling system including an adjustable rail according to certain aspects of the present invention.
Figure 2:
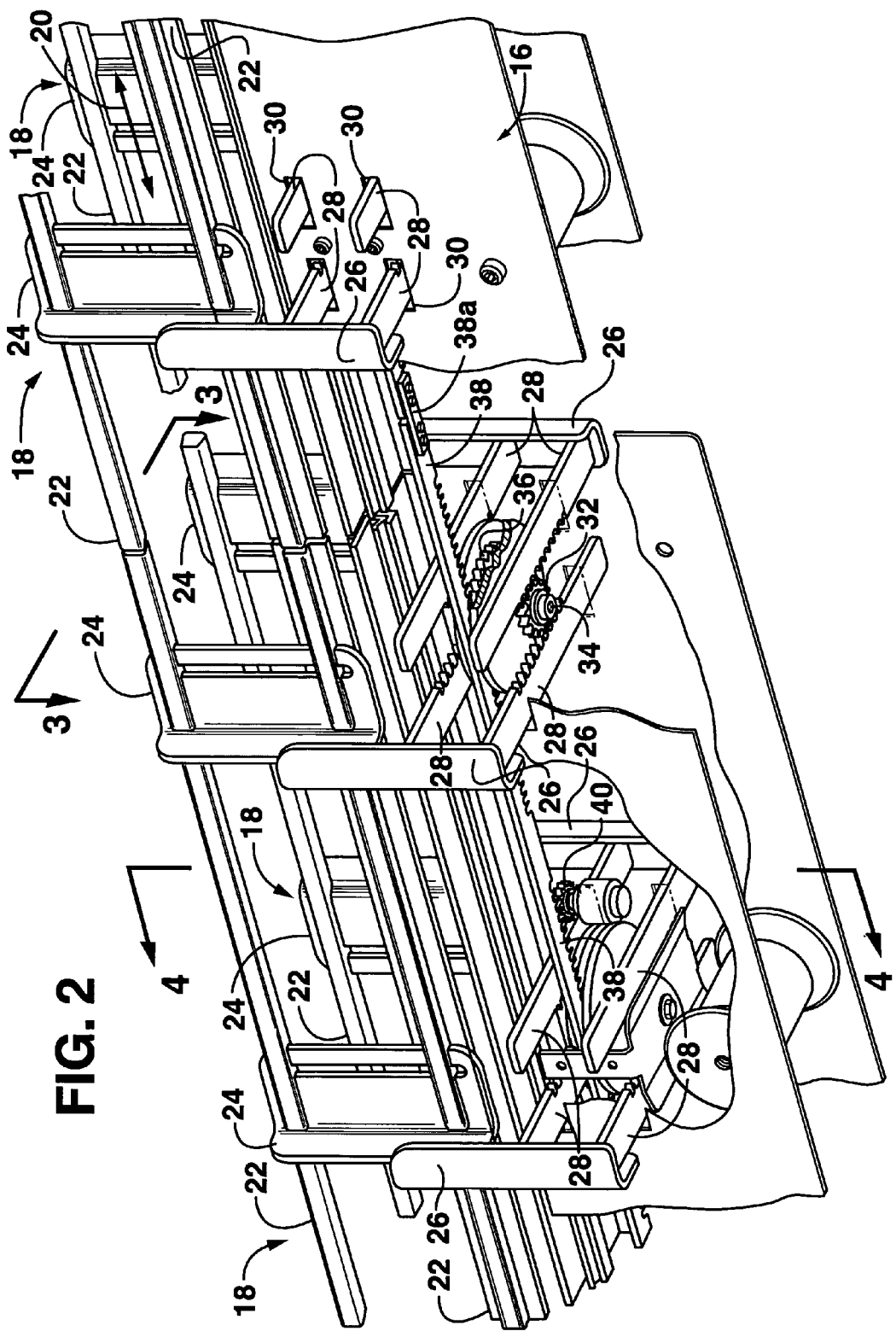
FIG. 2 is a lower perspective partially broken away view of a portion of the adjustable rail of FIG. 1 in a first position.
Figure 3:
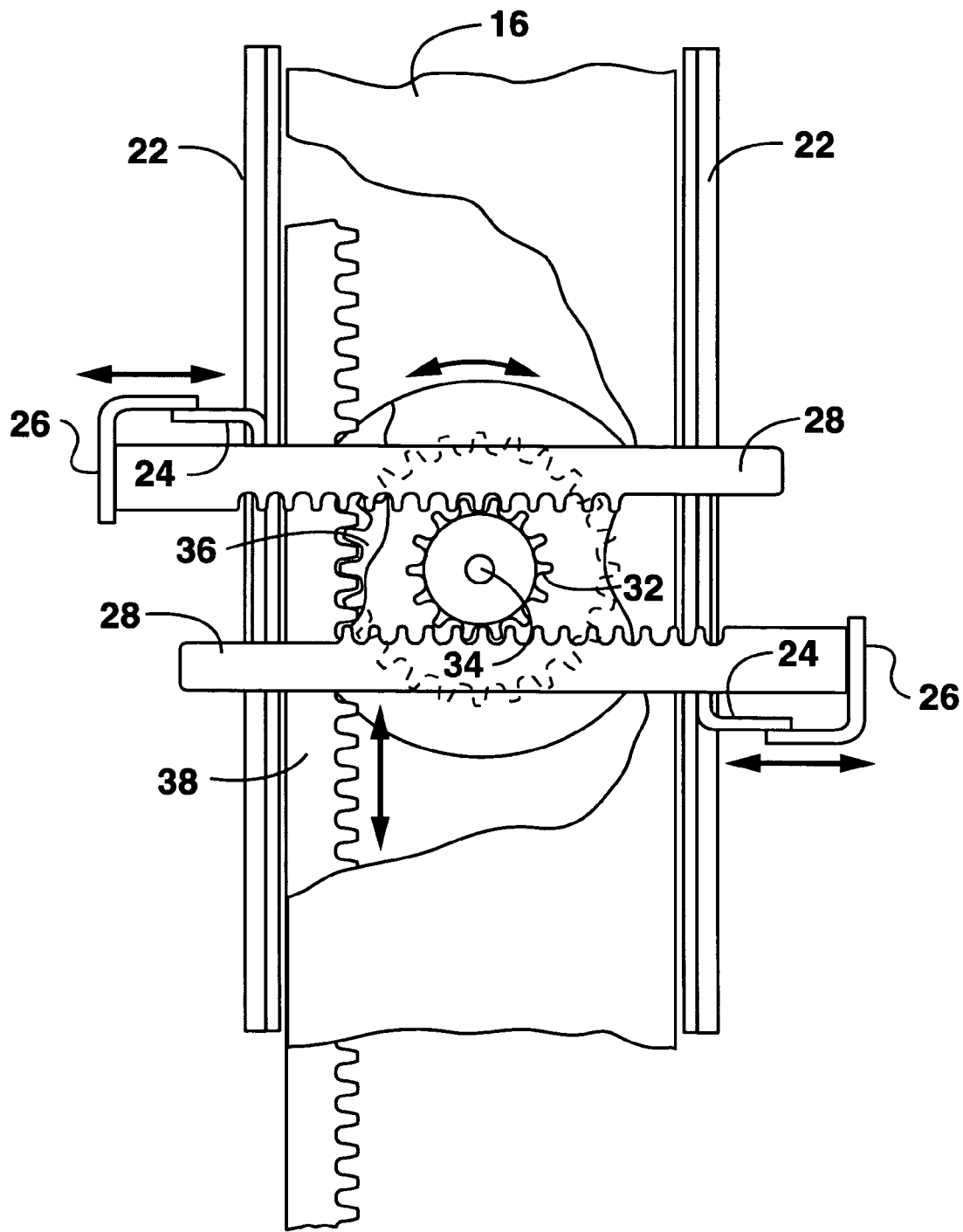
FIG. 3 is a partial sectional view of the adjustable rail as in FIG. 2, taken along line 3-3.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. In discussing various embodiments, like or similar reference numerals are used below with like or similar parts of various embodiments.

As shown in FIG. 1, a conveyor 10 is disposed adjacent an article processing station 12. The articles illustrated as being processed are bottles 14, although the present invention can be used with any conveyable articles. Also, the present invention can be use with various types of conveyors, such as knuckle conveyors, belt conveyors, etc. The present invention can also be used with any sort of article processing station, such as a filler, as illustrated, or an accumulator, a rinser, a capper, a labeler, a palletizer, a case packer, etc. Thus, the illustrated elements of FIG. 1 should be considered on as exemplary embodiments and not in any way limiting.

Conveyor 10 has a frame 16 supporting various elements. At least one movable side rail assembly 18 is located along a top portion of frame 16 adjacent a conveying path. FIG. 1 shows four of the movable rail assemblies 18, two side-by-side rail assemblies on either side of the conveying path 20. It should be understood that the movable rail assemblies 18 may be located along only one side of the conveying path, if desired, as such structure may provide enough adjustability in certain applications. Also, only one movable rail assembly 18 may be required on each side of the conveying path 20 (as opposed to the side-by-side arrangement shown) depending on the length of the conveyor 10.

Details of one possible movable rail assembly design are shown in FIGS. 2-4B. As illustrated, frame 16 supports movable rails 22 on support members 24 attached to arms 26 of toothed racks 28. Toothed racks 28 may slide back and forth across the conveying direction 20 within slots extending through frame 16. As shown, two rails 22 are attached to support members 24, but fewer or more could be used. Rails 22 may be metal or plastic or other materials, depending on the articles to be conveyed. Accordingly, the overall shape and configuration of rails 22 and support members may be modified liberally to suit a particular application.

Toothed racks 28 interface with and are driven by gears 32. If two toothed racks 28 are employed for each side support, as may be desired for stability, then two such gears 32 may be coaxially mounted on axle 34 extending from frame 16 (see FIG. 4A). It should be understood that only one toothed rack 28 and gear 32 may be employed as well in certain applications.

Gear 36 is also coaxially disposed on axle 34. Gear 36 serves as an input gear for transmitting rotation to gears(s) 32 and toothed racks 28. Toothed racks 38 in turn provide input to gears 36. Finally, a drive gear 40 provides input to toothed racks 38, although as discussed below, drive gear could be replaced by various structures. Adjacent toothed racks 38 may be joined for movement together by links 38a, which may either be rigid or may provide for relative pivoting, sliding, or telescoping, depending on the application. Pivoting, sliding, or telescoping may be desired where toothed racks are at least partially curved for following conveyors that are at least partially curved. Therefore, rails may be driven via the following elements: drive gear 40, toothed racks 38, gears 36, gears 34 and toothed racks 28. The number and arrangement of such gears can be modified according to the invention. Drive gear 40 may be connected to an output of a motor directly, via a shaft or transmission, by a belt or chain, or any other suitable power transmission method. Drive gear 40 may also be actuated by a hand crank, pneumatic actuator, hydraulic actuator, or the like. Actuator 41 is shown schematically in FIG. 5, as an example of a power source for drive gears 40, but it should be understood that various designs are possible. Also, one such actuator may power the drive gears on more than one adjustable rail assembly with corresponding power transmission equipment. Further, drive gear 40 may be eliminated if other manner of connection with actuator 41 is employed.

It should be understood that the interconnection between arms 26 and the gears 36 could be altered. For example, toothed racks 28 and gear 32 could be replaced with an alternate gear train. In one configuration, rotation received by gear 36 could be used to drive a threaded rod interfacing with a threaded piece (nut), or vice versa, to create the lateral motion of arm 26. A threaded rod and piece would be considered part of an alternate form of a gear train within the scope of the present disclosure.

Figure 4A:
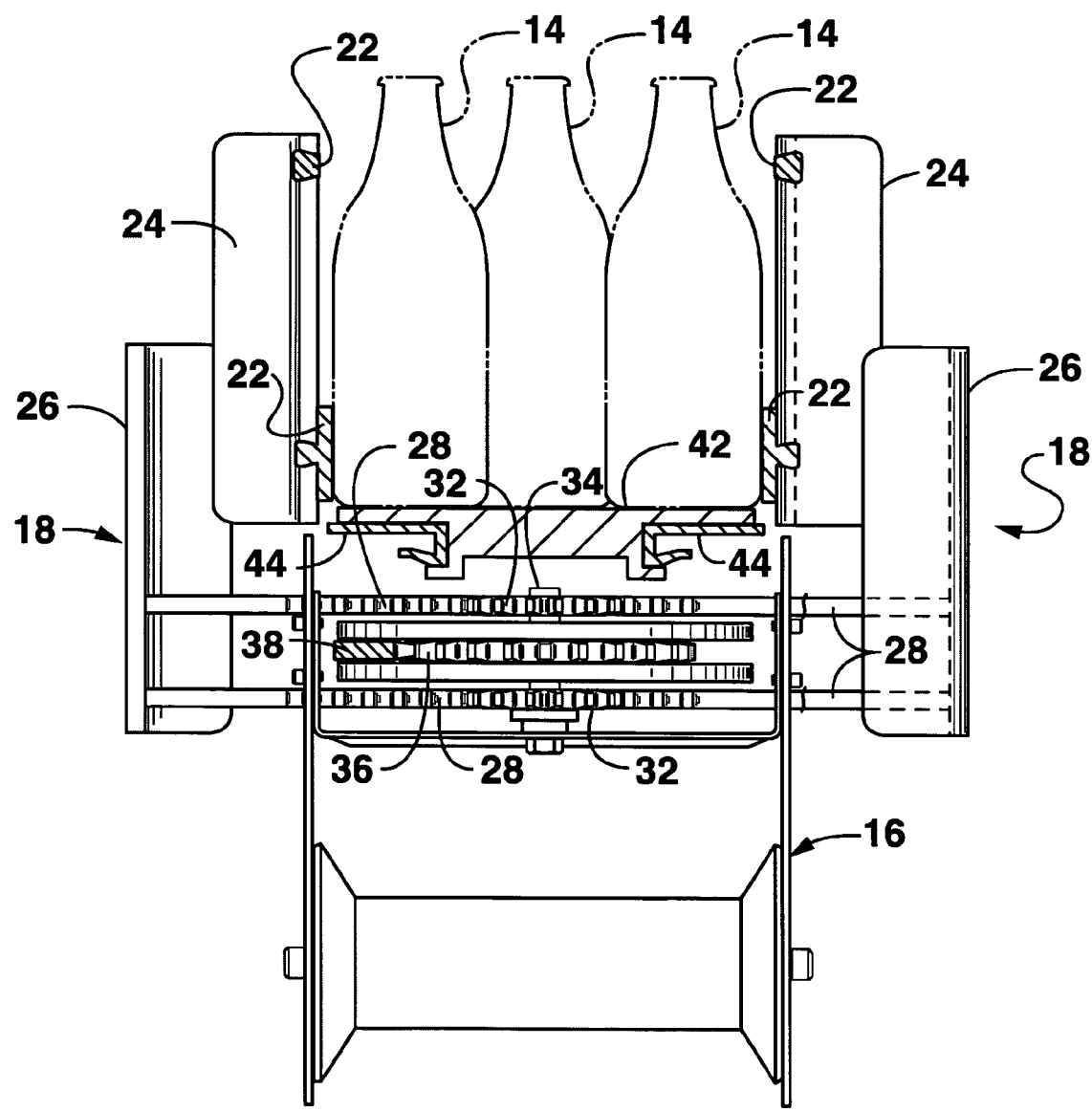
FIG. 4A is a partial sectional view of the adjustable rail as in FIG. 2 in a first position, taken along line 4-4.
Figure 4B:
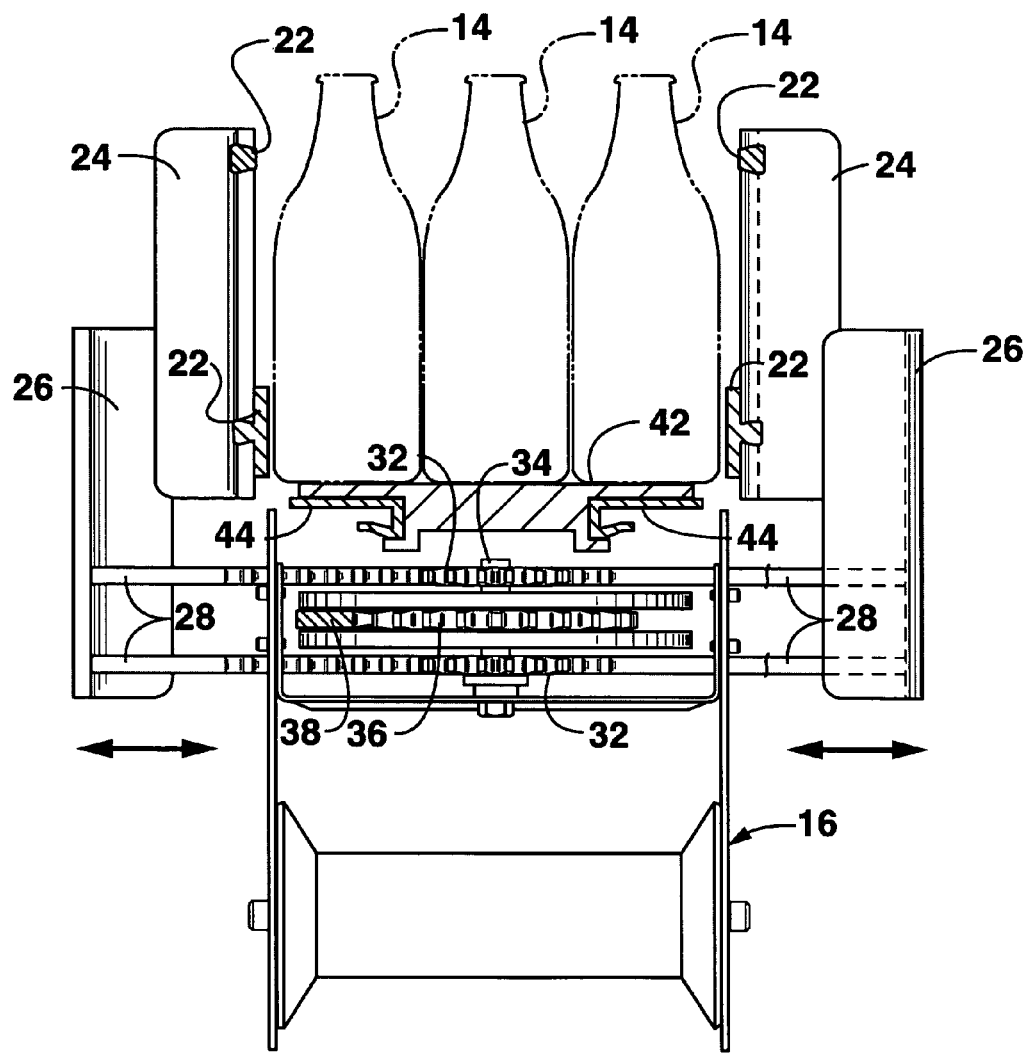
FIG. 4B is a partial sectional view as in FIG. 4A, with the adjustable rail in a different position.

FIGS. 4A and 4B show a conveyor belt 42 that rides on rails 44 secured to frame 16. Several articles 14 in a mass flow are depicted across conveyor belt 42. It should be understood that the adjustable rail assemblies 18 may also be used with single file flow. In fact, single file flow systems find particular utility with the adjustable rail assemblies, where precise control of position and or orientation of articles is desired, and/or where articles of differing sizes may be conveyed using the conveyor belt 42. Also, conveyor 42 may be of any design suitable for transporting the articles to be conveyed.

Figure 5:
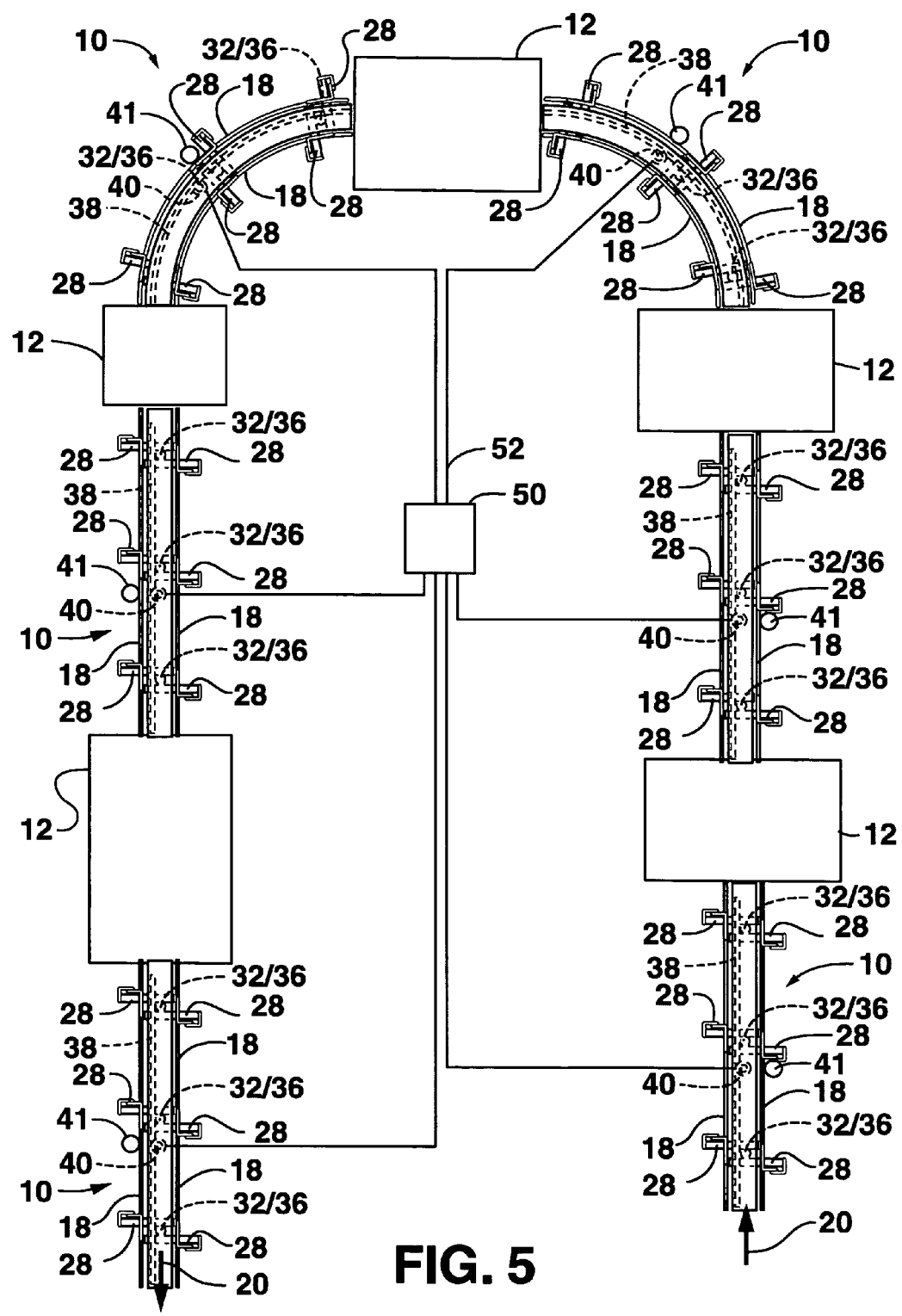
FIG. 5 is a top diagrammatical view of a system for adjusting a plurality of rails along an article handling system.

FIG. 5 shows a system in which processing stations 12 are disposed along a plurality of conveyors 10. The conveyors 10 each have adjustable rail assemblies 18 as described above. Certain of the conveyors 10 and their rail assemblies 18 are linear, and certain include curves. For the curved rail assemblies, it may be desirable to include overlapping or telescoping portions along toothed racks 28 and/or rails 22 to take into account radial movement. If telescoping or sliding portions are included, it may provide better performance to include them in straight portions of such elements. For example, rails 22 may be formed to include at least some linear portions along with the curved portions in such situation to allow for some adjustment in length as the side rails move radially inwardly or outwardly with reference to curve. For the distances of side rail motion required by a conveyor of articles as disclosed herein, a curved adjustment assembly 18 as disclosed herein will provide the desired adjustment, with enough precision to guide conveyed articles, and without the need for more complicated adjustment structures.

As shown, a controller 50 is connected via connections 52 to each actuator 41. If desired, as described above fewer actuators could be used. Also, wireless transmission could be employed as well to drive actuator(s) 41. Controller may be any suitable programmable logic controller, such as those made by Allen-Bradley, or other suitable motor controls. Optionally, sensors could be provided along rails to sense backup, pressure, rail position, etc., with the feedback being provided to controller 50 for modifying the position of rail assemblies or operation of the system. Through use of the disclosed subject matter, multiple rail assemblies may be readily positioned along multiple conveyors of a processing system. Substantial time and effort in adjusting numerous rail assemblies can be avoided. Also, individual assemblies can be adjusted as needed.

Therefore, it should be understood that the types of rail systems utilized with the teachings of the present disclosure should not be limited to those embodiments shown herein. It should also be understood that features of the various embodiments above may be recombined in other ways to achieve still further embodiments within the scope of the present invention.

What is claimed is:

1. An adjustable rail assembly for an article handling conveyor extending in a conveying direction, the assembly comprising:
   a frame;
   a first toothed rack mounted slidably to the frame and driven by a drive gear that rotates about a substantially vertical axis, the first toothed rack extending and slidable along the conveying direction;
   a plurality of driven gears rotatably mounted to the frame and driven by the first toothed rack, each of the driven gears rotating about a respective substantially vertical axis;
   a plurality of second toothed racks movably mounted to the frame, each second toothed rack driven by one of the driven gears, the second toothed racks extending across the conveying direction, each of the driven gears having a first set of teeth meshing with the first toothed rack and a coaxial second set of teeth meshing with the second toothed racks; and
   a side rail extending along the conveying direction for the article handling conveyor attached to the second toothed racks, whereby sliding movement of the first toothed rack in one direction or the other via the drive gear moves the side rail toward or away from the center of the conveyor via the driven gears and the second toothed racks.

2. The adjustable rail assembly of claim 1, wherein the side rail comprises a first side rail, the assembly further including a second side rail, the first side rail and second side rail mounted on opposite sides of the center of the conveyor and moving in unison in opposite directions relative to the center of the conveyor.

3. The adjustable rail assembly of claim 1, including a plurality of the first toothed racks arranged along the conveyor driven by a plurality of the drive gears for moving a plurality of side rails.

4. The adjustable rail assembly of claim 3, wherein the first toothed racks are arranged along a single conveyor.

5. The adjustable rail assembly of claim 3, wherein the first toothed racks are arranged along multiple conveyors within an article handling system.

6. The adjustable rail assembly of claim 3, further including a controller in electronic communication with a plurality of actuators, each actuator driving one of the first toothed racks.

7. The adjustable rail assembly of claim 3, wherein the first toothed racks are connected together at their ends so as to be drivable via a single actuator.

8. The adjustable rail assembly of claim 1, wherein the first toothed rack is substantially linear.

9. The adjustable rail assembly of claim 1, wherein the first toothed rack is substantially curved.

10. The adjustable rail assembly of claim 1, wherein two of the side rails are movably mounted to the frame on opposite sides of the conveyor and extending along the conveying direction.

* * * * *